(12) United States Patent
Oswald et al.

(10) Patent No.: US 7,776,987 B2
(45) Date of Patent: Aug. 17, 2010

(54) RESIN COMPOSITIONS FOR EXTRUSION COATING

(75) Inventors: Thomas Oswald, Lake Jackson, TX (US); James L. Cooper, Brazoria, TX (US); Jeffrey D. Weinhold, Lake Jackson, TX (US); David T. Gillespie, Pearland, TX (US)

(73) Assignee: Dow Global Technologies, Inc., Midland, MI (US)

( * ) Notice: Subject to any disclaimer, the term of this patent is extended or adjusted under 35 U.S.C. 154(b) by 304 days.

(21) Appl. No.: 10/566,937

(22) PCT Filed: Sep. 3, 2004

(86) PCT No.: PCT/US2004/029124
§ 371 (c)(1), (2), (4) Date: Feb. 2, 2006

(87) PCT Pub. No.: WO2005/023912
PCT Pub. Date: Mar. 17, 2005

(65) Prior Publication Data
US 2006/0281866 A1    Dec. 14, 2006

(51) Int. Cl.
C08F 110/02 (2006.01)
C08F 8/00 (2006.01)
C08L 23/00 (2006.01)
C08L 23/04 (2006.01)

(52) U.S. Cl. .................. 526/352.2; 526/352; 525/240; 525/191; 264/176.1

(58) Field of Classification Search .............. 525/240, 525/191; 526/352, 352.2; 264/176.1
See application file for complete search history.

(56) References Cited

U.S. PATENT DOCUMENTS

| | | | |
|---|---|---|---|
| 3,645,992 A | 2/1972 | Elston | |
| 3,914,342 A | 10/1975 | Mitchell | |
| 4,076,698 A | 2/1978 | Anderson et al. | |
| 4,339,507 A * | 7/1982 | Kurtz et al. | 428/522 |
| 4,486,552 A | 12/1984 | Niemann | |
| 4,599,392 A | 7/1986 | McKinney et al. | |
| 5,272,236 A | 12/1993 | Lai et al. | |
| 5,278,272 A | 1/1994 | Lai et al. | |
| 5,534,472 A * | 7/1996 | Winslow et al. | 502/116 |
| 5,582,923 A | 12/1996 | Kale et al. | |
| 5,773,155 A * | 6/1998 | Kale et al. | 428/523 |
| 5,879,768 A | 3/1999 | Falla et al. | |
| 5,962,599 A * | 10/1999 | Abe et al. | 525/333.8 |
| 6,306,969 B1 | 10/2001 | Patel et al. | |
| 6,441,096 B1 * | 8/2002 | Backman et al. | 525/240 |
| 2003/0032731 A1 * | 2/2003 | Oswald et al. | 525/240 |
| 2003/0055191 A1 | 3/2003 | Yasaka | |

FOREIGN PATENT DOCUMENTS

| | | |
|---|---|---|
| EP | 0 600 482 B1 | 4/1998 |
| WO | WO-96/16119 A | 5/1996 |
| WO | WO-02/074816 A2 | 9/2002 |
| WO | WO-02/074816 A3 | 9/2002 |

OTHER PUBLICATIONS

Wood-Adams, et al., Effect of Molecular Structure on the Linear Viscoelastic Behavior of Polyethylene, Macromolecules, vol. 3, pp. 7489-7499, 2000, American Chemical Society.
Williams and Ward, The Construction of a Polyethylene Calibration Curve for Gel Permeation Chromatography Using Polystryrene Fractions, Journal of Polymer Science, Polymer Letters, vol. 6, pp. 621-624, 1968, H.H. Wills Physics Laboratory, England.
Halle and Simpson, A New Enhanced Polyethylene for Extrusion Coating and Laminating, TAPPI 2002 PLACE conference.

* cited by examiner

Primary Examiner—Vasu Jagannathan
Assistant Examiner—Irina Krylova

(57) ABSTRACT

A composition is disclosed which is particularly suited for use in extrusion coating. The composition comprises a polymeric material having a rheology such that the slope S of a natural log-natural log plot of loss modulus (or G") versus storage modulus (or G') is greater than [0.635*(melt index)+13.2]/[(melt index)+16.6], and wherein the polymeric material has a CDF RI fraction less than 0.23 of a GPC chromatogram which has a molecular weight above 85,000 g/mol, and a CDF LS fraction of more than 0.07 at a conventional GPC molecular weight of 1,750,000 g/mol or greater. The compositions exhibit reduced neck-in when used in extrusion coating and the neck-in is independent of melt strength, thereby facilitating improved extrusion processes.

27 Claims, 7 Drawing Sheets

Low Angle Laser Light Scattering CDF Overlay

RESIN COMPOSITIONS FOR EXTRUSION COATING

This invention pertains to polyethylene extrusion compositions. In particular, the invention pertains to ethylene polymer extrusion compositions in the density range 0.956 g/cc to 0.863 g/cc having high drawdown and substantially reduced neck-in. The invention also pertains to a method of making the ethylene polymer extrusion composition and a method for making an extrusion coated article, an article in the form of an extrusion profile and an article in the form of an extrusion cast film.

It is known that low density polyethylene (LDPE) made by high-pressure polymerization of ethylene with free-radical initiators as well as Linear PE (defined herein to mean linear and substantially linear homogenous and heterogeneous polyethylene copolymers and homopolymers) such as heterogeneous linear low density polyethylene (LLDPE) and ultra low density polyethylene (ULDPE) made by the copolymerization of ethylene and α-olefins with Ziegler-Natta coordination (transition metal) catalysts at low to medium pressures can be used, for example, to extrusion coat substrates such as paper board, paper, and/or polymeric substrates; to prepare extrusion cast film for applications such as disposable diapers and food packaging; and to prepare extrusion profiles such as wire and cable jacketing. However, although LDPE generally exhibits excellent extrusion processability and high extrusion drawdown rates, LDPE extrusion compositions lack sufficient abuse resistance and toughness for many applications. For extrusion coating and extrusion casting purposes, efforts to improve abuse properties by providing LDPE compositions having high molecular weights (that is, having melt index, $I_2$, less than about 2 g/10 min) are not effective since such compositions inevitably have too much melt strength to be successfully drawn down at high line speeds.

While Linear PE in the form of ULDPE (Ultra Low Density Polyethylene) extrusion compositions offer improved abuse resistance and toughness properties and MDPE (medium density polyethylene) and HDPE (high density polyethylene) extrusion compositions offer improved barrier resistance (against, for example, moisture and grease permeation), these linear ethylene polymers exhibit unacceptably high neck-in and draw instability; they also exhibit relatively poor extrusion processability, as measured by motor load and back pressure in the extruder, compared to pure LDPE.

In certain applications it is necessary to coat a substrate with resin of higher density than it is possible to make in the conventional high pressure processes. Examples of such applications are release papers, backing of photographic print papers and the like. In these situations use of pure Linear PE of the appropriate density is not desired since such resins are subject to severe draw instability phenomena such as draw resonance and edge-weave as well as unacceptable neck-in. These deficiencies are partially overcome by blending a medium melt index autoclave LDPE with the high density Linear PE. This is conventionally done with Linear PE having a melt index of from 5 to 10 g/10 minutes and from 20 to 50% of a LDPE havin a melt index of from 5 to 8, however these blends suffer from relatively high neck-in and low drawdown. The large amount of LDPE also reduces the upper density possible with the blend. Conversely when resin compositions of density lower than is possible with LDPE are required, the large amount of LDPE increases the lower density limit of such blends. Thus, there is a need for compositions to provide low neck-in, high draw-down and increased upper and lower density limits.

In coating of woven (scrim) and non-woven substrates, it is frequently necessary for the coating resin to flow around the fibers to create adhesion, as the polyethylene may not adhere to the substrate by surface attractive forces. A typical substrate is polypropylene. In these cases, high melt index LDPE is often used as it has the ability to flow around the fibers. Unfortunately, such LDPE resins often exhibit web instabilities. Therefore there is a need for polyethylene compositions capable of successfully adhering to woven substrates while at the same time exhibiting little or no draw instabilities and low neck-in at commercial production rates.

In sealant applications, such as are used in flexible packaging and paper board/Aluminum Foil/PE juice containers, it is desirable that the seal initiation temperature be low, together with a high hot-tack or heat-seal strength. Pure LDPE resins have been used for these applications, typically of melt index in the range from 7 to 15. The recent introduction of metallocene catalyzed Linear PE has offered lowered seal initiation temperature and stronger seal strengths. Such Linear PE resins are generally blended with an LDPE resin to provide reasonably satisfactory processability parameters such as improved neck-in, reduced draw instability and power consumption, compared to the pure Linear PE. However, although these compositions do provide improved seal performance compared to pure LDPE, their processability is substantially inferior. (see R. W. Halle, D. M. Simpson, "A New Enhanced Polyethylene for Extrusion Coating and Laminating", TAPPI 2002 PLACE Conf) Therefore there is a need for resin compositions which provide improved seal performance and processability approaching or exceeding that of traditional LDPE resins.

We have found that many of these deficiencies are substantially ameliorated through mixtures comprising low melt index LDPE, (typically in the range 0.2 to 1.0 g/10 min) in the amount of 10 to 25% together with high melt index Linear PE, where the melt index of the Linear PE is in the range 20 to 100, preferably 30 to 40. The density and type of the Linear PE is determined by the final end use of the coated substrate. In particular, the LDPE is characterized by having a MWD greater than 10, and a Mw(absolute)/Mw(GPC) ratio greater than 3.0.

It is generally believed that neck-in and melt strength are inversely related. Thus, in references such as U.S. Pat. Nos. 5,582,923 and 5,777,155 to Kale et al. (each of which is hereby incorporated by reference in its entirety), adding Linear PE to improve physical toughness came at the expense of extrudability factors such as increased neck-in. Thus in the extrusion coating industry, current practice is to utilize lower melt index LDPE for extrusion on equipment with narrower die widths and relatively low maximum take off rates. Such low melt index autoclave LDPE resins provide low neck-in (less than 2 inches (1 inch for each side)) and sufficient draw-down speed. Faster equipment, typically with wider die widths and improved internal deckling, is supplied with higher melt index autoclave LDPE, which unfortunately, tends to yield greater neck-in. Thus several grades of LDPE are currently required, necessitating complex product handling capability at both resin manufacturer and at the extrusion coating facility, with additional requirements for inventory storage. It would therefore be advantageous to provide a single grade of resin which simultaneously yielded high drawdown and low neck-in.

Such a new family of compositions has now been discovered which breaks the traditional relationship between neck-in and melt strength, meaning that the neck-in can be controlled independently of the melt strength of the polymer. In the preferred application of these these new compositions exhibiting low neck-in, the melt strength is low, below 5 cN and in many useful instances of the invention the melt strength is too low to measure at the standard temperature of 190 Celsius. The melt index of the Linear PE may vary in the range from 20 to 100 g/10 min, with the resulting melt strength varying in the range 5 to below 1 cN, while the melt index of the resulting blend is changed substantially. Thus the melt index may be varied over wide ranges without substantially affecting the neck-in performance and thus it is possible to provide compositions exhibiting low neck-in, high draw-down and lower power consumption than normally associated with Linear PE based extrusion coating resins.

In the preferred practice of the present invention this neck-in is less than approximately two inches (1" per side) at a haul-off rate of approximately 440 feet/minute. The practical range of melt index is from 3 to 30 g/10 min in most coating applications, and the compositions of the present invention can cover this entire range, however the preferred range is from 10 to 30 g/10 min to maintain draw-down above 1200 ft/min. It is desirable that the maximum operating speed of the extrusion coating equipment not be limited by the properties of the resin being used. Thus it is desirable to use resin which exhibits neither draw instability nor breaking before the maximum line speed is reached. It is even more desirable that such resin exhibit very low neck-in, less than 2 inches. The resins provided in this invention exhibit low neck-in and excellent draw stability while the draw-down capability required is obtained by selecting the correct melt index. Typically the melt index is in the range of 10 to 20 g/10 min. It is a further feature of this invention that it provides a resin at, for example, a melt index of 15 g/10 min that will be suitable for extrusion on both older equipment having slow take-off and modern high speed equipment. In both situations the neck-in can be less than 2 inches.

The resin compositions of the present invention can be characterized by their rheological properties. It is believed that the rheology of composition of the present invention is one of the requirements necessary to achieve the independence of the neck-in versus melt index observed with the compositions. The compositions can be characterized as having a rheology such that the estimated slope (or S) (by linear least squares regression) of a natural log (loss modulus (or G")) versus natural log (storage modulus (or G')) is greater than [0.635*(melt index)+13.2]/[(melt index)+16.6], wherein the melt index is the melt index of the composition measured in accordance with ASTM D1238, condition 190° C./2.16 kg.

It has been discovered that the desired rheology is obtained from resins containing relatively small amounts of molecules having high molecular weight and which are highly branched. Resins with this structural component exhibit the surprising combination of low neck-in and, at melt indices above 10 g/10 min, high draw down. Accordingly, the resins of the present invention can also be distinguished according to their structural architecture as determined by gel permeation chromatography. The resins of the current invention are those in which the percentage fraction of a GPC chromatogram which has a molecular weight above 85,000 as determined by gel permeation chromatography with a differential refractometer detector, is less than 23% of the total area of the GPC chromatogram, and yet more than 7% of the total light scattering area from a low angle laser light scattering detector occurs above a conventional GPC molecular weight of 1,750,000 g/mol. Further, the branching of the high molecular weight portion of the composition is preferably tree-like as opposed to comb-like as expressed in the Mark-Houwink plot (such as described by Wood-Adams, Dealy, deGroot and Redwine, "Effect of Molecular Structure on the Linear Viscoelastic Behavior of Polyethylene", 33 Macromolecules 2000, 7489), where the slope is less than 0.25 in the absolute molecular weight range between 300,000 and 3,000,000.

The resin compositions may advantageously comprise a blend of materials such as an Linear PE material together with an LDPE having a high molecular weight, highly branched component. The compositions may also include other polymeric materials such as polypropylene, ethylene-styrene copolymers, high pressure ethylene copolymers such as ethylvinylacetate (EVA) and ethylene acrylic acid, and the like.

Linear PE in the preferred blends for use in making the compositions of the present invention can be any Linear PE known in the art, and can be varied depending on the physical properties desired, as is generally known in the art.

The preferred LDPE for use in making the compositions of the present invention has a Melt Index (I2) as measured in accordance with ASTM D1238, condition 190° C./2.16 kg of from 2 to 0.2 g/10 min, a melt strength of from 25 to 50 cN or greater respectively, an Mw/Mn as measured by conventional GPC greater than 10 and a Mw(absolute)/Mw(GPC) ratio of greater than 3.0. Such an LDPE is preferably made in an autoclave reactor with chilled ethylene feed below 35° C. operating in single phase mode with three or more zones. The reactor is preferably run above the transition point (phase boundary between a two-phase and a single phase system) at an average reactor temperature of approximately 240° C.

Another aspect of the present invention is a process for improving extrusion coating performance by using the resins of the present invention.

Figure 1:
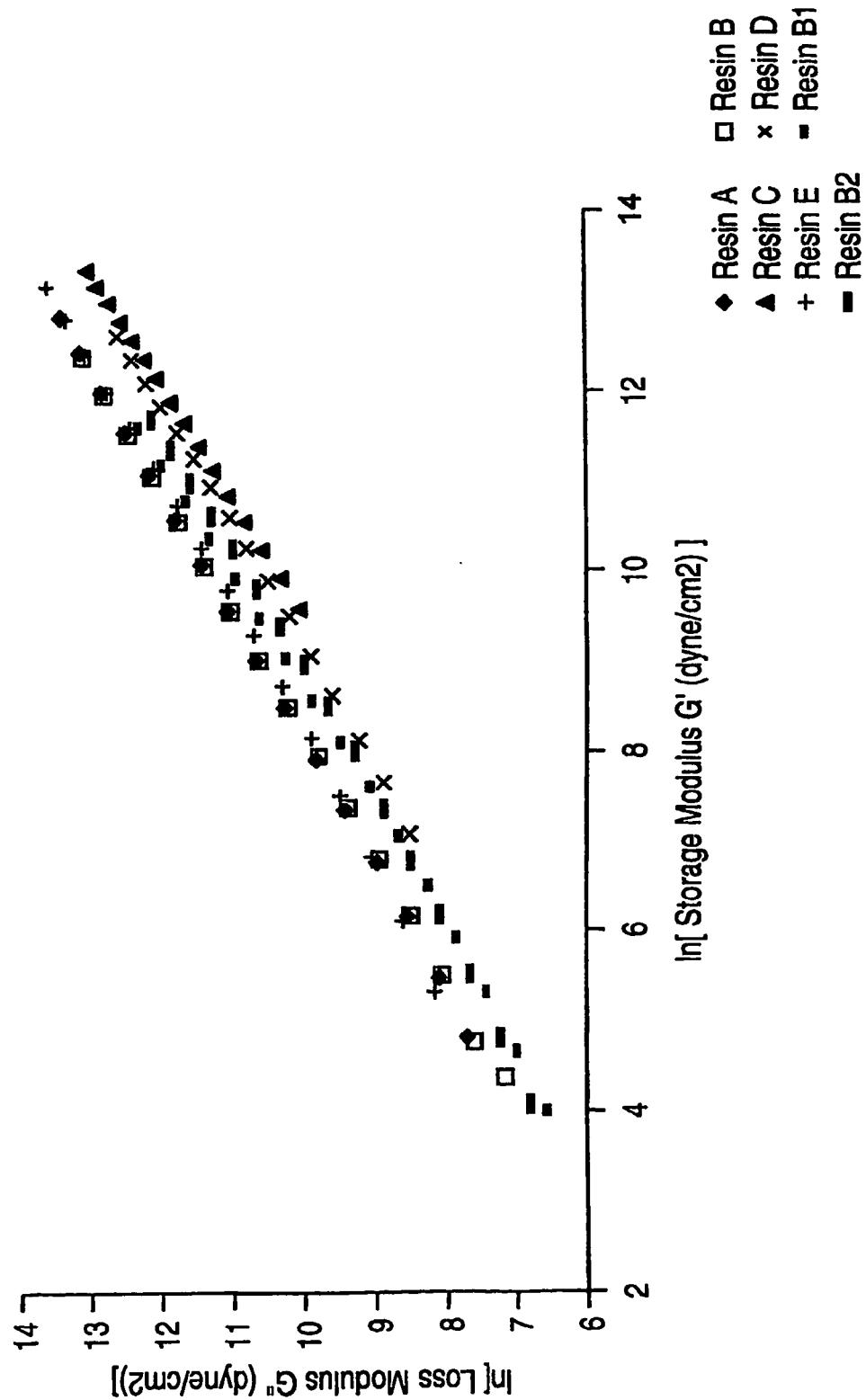
FIG. 1 is a plot of the natural log of loss modulus G" versus elastic or storage modulus G' for a series of resins.

The following terms shall have the given meaning for the purposes of this invention:

"Haul-Off" is defined herein to mean the speed at which the substrate is moving, thus stretching or elongating a molten polymer extrudate.

"Melt strength" which is also referred to in the relevant art as "melt tension" is defined and quantified herein to mean the force (as applied by a wind-up drum equipped with a strain cell) required to draw a molten extrudate at a haul-off velocity at which the melt strength plateaus prior to breakage rate above its melting point as it passes through the die of a standard plastometer such as the one described in ASTM D1238-E. Melt strength values, which are reported herein in centi-Newtons (cN), are determined using a Gottfert Rheotens at 190° C. Density is tested in accordance with ASTM D792.

"Neck-in" is defined herein as the difference between the die width and the extrudate width on the fabricated article. The neck-in values reported herein are determined at a haul off rate of 440 feet/minute which yields a 1 mil coating thickness at an extrusion rate of approximately 250 lbs/hr, at a temperature of 600° F. (except where otherwise noted) using a 3.5-inch diameter, 30:1 L/D Black-Clawson extrusion coater equipped with a 30 inch wide die deckled to 24 inches and having a 25-mil die gap. "Drawdown" means the haul-off speed (using the same equipment, extrusion rate and temperature) at which the molten polymer breaks from the die or the speed at which edge instability was noted.

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference).

The term "Linear PE" is defined to mean any linear, substantially linear or heterogeneous polyethylene copolymer or homopolymer. The Linear PE can be made by any process such as gas phase, solution phase, or slurry or combinations thereof. The Linear PE may consists one or more components, each of which is also a Linear PE.

The term molecular weight distribution or "MWD" is defined as the ratio of weight average molecular weight to number average molecular weight ($M_w/M_n$). $M_w$ and $M_n$ are determined according to methods known in the art using conventional GPC. The ratio Mw(absolute)/Mw(GPC) is defined wherein Mw(absolute) is the weight average molecular weight derived from the light scattering area at low angle (such as 15 degrees) and injected mass of polymer and the Mw(GPC) is the weight average molecular weight obtained from GPC calibration. The light scattering detector is calibrated to yield the equivalent weight average molecular weight as the GPC instrument for a linear polyethylene homopolymer standard such as NBS 1475.

Description of the Composition

The composition of matter of the present invention can be characterized according to its rheological properties and its molecular architecture as determined by multiple detector GPC.

It is believed that the rheology of the composition of the present invention leads to the independence of the neck-in versus melt index of the composition. The rheology of the compositions can be demonstrated according to the following method which uses dynamic shear rheology to independently measure the elastic and viscous responses of a polymer sample. The measurement should be performed at a temperature of 190° C. and a range of frequencies from 0.1 to 100 1/sec using an oscillatory shear rheometer such as a Rheometrics RMS-800. The natural logarithm of these values can then be plotted (ln (G") vs. ln(G')).

A linear least squares regression can be performed on the ln(G") vs. ln (G') data, resulting in an equation of the form:

$$\mathrm{Ln}(G")=S*(\mathrm{ln}(G'))+G,$$

Where S is the regressed slope of the line, and G is the natural log of G" when the natural log of G' is zero.

It has been discovered that the S determined by the regression is an especially useful parameter for quantifying the elasticity of each resin. Compositions of the present invention can be differentiated by having an S exceeding [0.635*(melt index)+13.2]/[(melt index)+16.6]. Preferably, the compositions of the present invention exceed this value by more than 1%, more preferably more than 1.5%.

Figure 6:
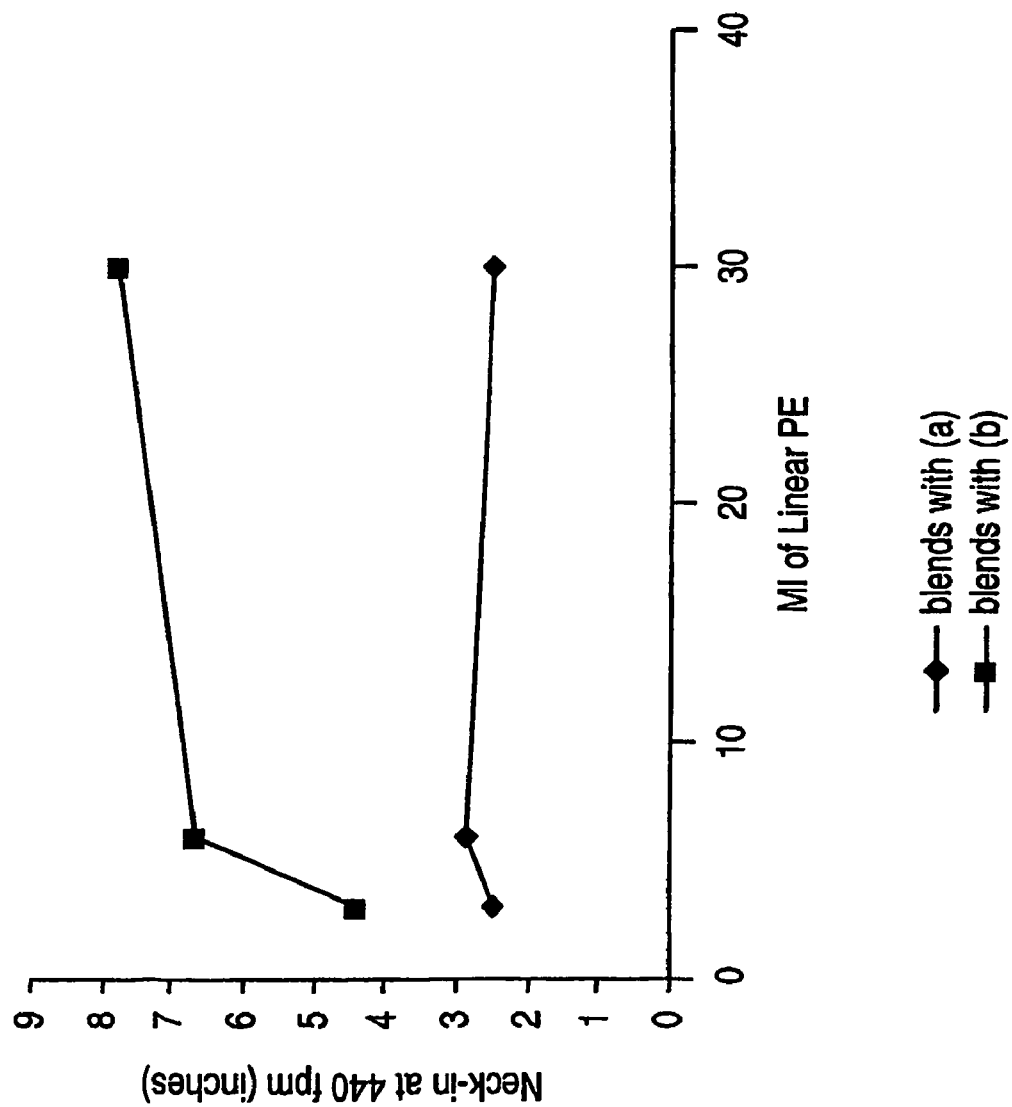
FIG. 6 is a plot of neck in performance as the MI of the Linear PE is adjusted for blends of Linear PE with 2 different types of LDPE, showing the independence of neck-in and MI for the preferred blends of the present invention.

These compositions surprisingly exhibit neck-in performance in extrusion coating which is effectively independent of the melt index, particularly when the compositions comprise at least 13% of the preferred LDPE. This independence is not achieved at the expense of a reduction in draw-down. Thus it is possible to provide resins having high melt index and high draw down but surprisingly low neck-in. This independence is shown in FIG. 6 in which Linear PE at various melt indices ranging from 30 to 3 g/10 min was blended with 15% by weight of either (a) a 0.47 MI LDPE with MWD>10.0 and Mw(absolute)/Mw(GPC)>3.0, or (b) a 8.0 MI LDPE with MWD<10.0 and Mw(absolute)/Mw(GPC) of about 2.7. The neck-in for these blends was measured at a rate of 440 ft/minute and the values are plotted in FIG. 6. However, the draw-down is controlled by the melt index of the final composition, with compositions with higher melt index providing greater draw down. In no instance have such compositions been observed to exhibit measurable draw resonance or edge weave before web break.

The composition of matter of the present invention can also be characterized according to its unique molecular architecture as evidenced by multiple detector gel permeation chromatography (GPC). When using a properly calibrated GPC, equipped with at least a low angle laser light scattering detector (LS) and a conventional refractive index (RI) detector, the compositions of the present invention will exhibit the following properties: First, the percentage fraction of a GPC chromatogram which has a linear equivalent polyethylene molecular weight above 85,000 as determined by gel permeation chromatography with a differential refractometer detector, is less than 23% of the total area of the GPC chromatogram, and yet more than 7% of the total light scattering area from a low angle laser light scattering detector occurs above a conventional GPC molecular weight of 1,750,000 g/mol. Preferably, the material will have a percentage fraction of a GPC chromatogram which has a molecular weight above 85,000 as determined by gel permeation chromatography with a differential refractometer detector, less than 21%, more preferably less than 20% and most preferably less than 15% of the total area of the GPC chromatogram. Preferably the material will also have more than 9% of the total light scattering area from a low angle laser light scattering detector occurring above a conventional GPC molecular weight of 1,750,000 g/mol.

The compositions of the present invention can have any melt strength, and surprisingly in view of the low neck-in observed with these resins, melt strength less than 9 cN and more preferably less than 5 cN are particularly advantageous.

As should be understood from the foregoing, the physical properties of the compositions of the present invention when coated on a substrate can be tailored according to the particular needs. In the preferred blends of the invention, for example, the particular Linear PE (or combinations of Linear PE with other material including other Linear PE) portion can be selected to optimize whatever characteristics are desired. For example tensile properties and abuse resistance will typically exceed those of conventional LDPE. We have also found that heat seal properties and hot tack properties are superior to conventional LDPE, showing lower initiation temperatures and increased seal and hot tack strength.

It will be appreciated by one of ordinary skill in the art that the composition of the present invention will be slightly modified after conversion into a fabricated article such as a film layer. Another aspect of the invention is therefore a polymeric film layer having a rheology such that the S of a natural log-natural log plot of loss modulus (or G") versus storage modulus (or G') is greater than [0.665*(melt index)+ 14.2]/[(melt index)+16.6], and wherein the polymeric material has a CDF RI fraction less than 0.23 of GPC chromatogram which has a linear equivalent polyethylene molecular weight above 85,000, and a CDF LS fraction of more than 0.07 at a conventional GPC molecular weight of 1,750,000 g/mol or greater. The film layer can preferably be from 0.1 to 40 mils. The film layers of the present invention may advantageously be subjected to treatment such as flame or corona treatment and printing as is known in the art. Substrates for use with the film layers can be flame treated, corona treated, or coated with various primers to promote adhesion.

As a consequence of the ability to provide resins of high melt index that provide neck-in performance associated with traditional LDPE of lower melt indices (for example, from 5 to 9 g/10 min), the preferred blends of the present invention exhibit processability (as determined by motor load requirements) similar to traditional high pressure low density polyethylene used in extrusion coating and extrusion lamination applications, despite the majority of composition comprising Linear PE.

The inventive composition can advantageously be achieved using a blend of Linear PE and LDPE, optionally with additional polymers such as minor amounts of polypropylene. The preferred blends of the present invention will preferably comprise at least 70 percent of the composition based on the total weight of the composition, and may comprise up to 100% of the composition. The Linear PE portion of the blend will preferably comprise 70% by weight of the blend. More preferably the blend comprises at least 75 percent, still more preferably 80 to 85 percent of the Linear PE. The inventive composition should contain no more than 95 percent of the Linear PE, but preferably no more than 90 percent, and most preferably no more than 85 percent of the Linear PE.

The inventive composition also contains at least 5 percent, preferably at least 10, more preferably 15 to 20 percent, based on the total weight of the composition, of at least one high pressure ethylene polymer composition or LDPE. Preferably this component is no more than 30 percent of the total composition, more preferably no more than 25 percent, most preferably no more than 20 percent. It should be understood that the total amount of Linear PE and LDPE does not necessarily have to equal 100%.

The molecular architecture of the preferred high pressure ethylene polymer composition is believed to be related to the neck-in, and rheological properties of the final composition. Without intending to be bound to theory, it is believed that the LDPE portion of the preferred blends for the present invention can supply high molecular weight, highly branched structure which leads to the unique combination of rheology and molecular architecture. It should be understood, however, that the high molecular weight highly branched portion need not come from a high pressure low density resin, and other processes such as those described in WO 02/074816, may be applicable.

The preferred LDPE for use in the present invention has a Melt Index ($I_2$) of from 0.2 to 2 g/10 min. More preferably the melt index is greater than 0.25, most preferably more than 0.3 g/10 min. The melt index is preferably less than 2, more preferably less than 1, and most preferably less than 0.7 g/10 min. The melt strength of the LDPE is preferably greater than 24.1−18.0*log 10(MI) or alternatively 25 cN or greater, more preferably 30 cN or greater, and most preferably 40 cN or greater. For practical reasons the melt strength is preferably less than 100 cN. The preferred LDPE also has a $M_w/M_n$ as measured by conventional GPC greater than 10, preferably greater than 12 and a Mw(absolute)/Mw(GPC) ratio of greater than 3.0, preferably greater than 3.2 and most preferably greater than 3.5.

Such an LDPE can be made in an autoclave reactor with chilled ethylene feed below 35° C. operating in single phase mode with three or more zones. The reactor is preferably run above the transition point (phase boundary between a two-phase and a single-phase system) at an average reactor temperature of approximately 240° C.

The composition of the present invention may also include LDPE/LDPE blends where one of the LDPE resins has a relatively higher melt index and the other has a lower melt index and is more highly branched. The component with the higher melt index can be obtained from a tubular reactor, and a lower MI, higher branched, component of the blend may be added in a separate extrusion step or using a parallel tubular/ autoclave reactor in combination with special methods to control the melt index of each reactor, such as recovery of telomer in the recycle stream or adding fresh ethylene to the autoclave (AC) reactor, or any other methods known in the art.

Suitable high pressure ethylene polymer compositions for use in preparing the inventive extrusion composition include low density polyethylene (homopolymer), ethylene copolymerized with at least one α-olefin for example, butene, and ethylene copolymerized with at least one α,β-ethylenically unsaturated comonomers, for example, acrylic acid, methacrylic acid, methyl acrylate and vinyl acetate. A suitable technique for preparing useful high pressure ethylene copolymer compositions is described by McKinney et al. in U.S. Pat. No. 4,599,392.

While both high pressure ethylene homopolymers and copolymers are believed to be useful in the invention, homopolymer polyethylene is generally preferred.

Linear PE

Any type of Linear PE can be used in the blends which make up the preferred compositions of the present invention. This includes the substantially linear ethylene polymers which are further defined in U.S. Pat. Nos. 5,272,236, 5,278, 272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 or 5,854, 045). The Linear PE can be made via gas-phase, solution-phase or slurry polymerization or any combination thereof, using any type of reactor or reactor configuration known in the art.

When used in the present invention, the Linear PE preferably has a melt index of 20 g/10 min or greater, more preferably greater than 25 g/10 min and most preferably at least 30 g/10 min. The melt index of the Linear PE can be as high as 1000 g/10 min, preferably 500 or less, most preferably less than 50 g/10 min.

Preparation of the Polymer Extrusion Composition

The preferred blends for making the polymer extrusion compositions of this invention can be prepared by any suitable means known in the art including tumble dry-blending, weigh feeding, solvent blending, melt blending via compound or side-arm extrusion, or the like as well as combinations thereof. Surprisingly, in view of the melt index difference between the low melt index LDPE component and the higher melt index component, either Linear PE or LDPE, these blends do not require special mixing procedures to prevent gels. Dry blend mixes extruded with a 30:1 single screw provide a resulting film layer with minimal umixed gels The inventive extrusion composition can also be blended with other polymer materials, such as polypropylene, high pressure ethylene copolymers such as ethylene vinyl acetate (EVA), ethylene ethylacrylate (EEA), and ethylene acrylic acid (EAA) and the like, ethylene-styrene interpolymers, so long as the necessary rheology and molecular architecture as evidenced by multiple detector GPC are maintained. The composition can be used to prepare monolayer or multilayer articles and structures, for example, as a sealant, adhesive or tie layer. The other polymer materials can be blended with the inventive composition to modify processing, film strength, heat seal, or adhesion characteristics as is generally known in the art.

Both the LDPE and the Linear PE portions of the preferred composition can be used in a chemically and/or physically modified form to prepare the inventive composition. Such modifications can be accomplished by any known technique such as, for example, by ionomerization and extrusion grafting.

Additives such as antioxidants (for example, hindered phenolics such as Irganox® 1010 or Irganox® 1076 supplied by Ciba Geigy), phosphites (for example, Irgafos® 168 also supplied by Ciba Geigy), cling additives (for example, PIB), Standostab PEPQ™ (supplied by Sandoz), pigments, colorants, fillers, can also be included in the ethylene polymer extrusion composition of the present invention, to the extent that they do not interfere with the high drawdown and substantially reduced neck-in discovered by Applicants. In extrusion coating applications requiring strong adhesion, the inventive compositions preferably contain no or only limited amounts of antioxidants as these compounds may interfere with adhesion to the substrate. However, compositions with high levels of anti-oxidants may be made to adhere using techniques known in the art such as corona and flame treatment of the substrate and by increasing the resin extrusion temperature The article made from or using the inventive composition may also contain additives to enhance antiblocking and coefficient of friction characteristics including, but not limited to, untreated and treated silicon dioxide, talc, calcium carbonate, and clay, as well as primary, secondary and substituted fatty acid amides, chill roll release agents, silicone coatings, etc. Other additives may also be added to enhance the anti-fogging characteristics of, for example, transparent cast films, as described, for example, by Niemann in U.S. Pat. No. 4,486,552. Still other additives, such as quaternary ammonium compounds alone or in combination with ethylene-acrylic acid (EAA) copolymers or other functional polymers, may also be added to enhance the antistatic characteristics of coatings, profiles and films of this invention and allow, for example, the packaging or making of electronically sensitive goods. Other functional polymers such as maleic anhydride grafted polyethylene may also be added to enhance adhesion, especially to polar substrates.

Multilayered constructions comprising the inventive composition can be prepared by any means known including coextrusion, laminations and combinations thereof. Moreover, compositions of this invention can be employed in coextrusion operations where a higher drawdown material is used to essentially "carry" one or more lower drawdown materials. In particular the compositions of this invention are well suited to carry a material of lower draw-down.

The ethylene polymer extrusion compositions of this invention, whether of monolayer or multilayered construction, can be used to make extrusion coatings, extrusion profiles and extrusion cast films as is generally known in the art. When the inventive composition is used for coating purposes or in multilayered constructions, substrates or adjacent material layers can be polar or nonpolar including for example, but not limited to, paper products, metals, ceramics, glass and various polymers, particularly other polyolefins, and combinations thereof. For extrusion profiling, various articles can potentially be fabricated including, but not limited to, refrigerator gaskets, wire and cable jacketing, wire coating, medical tubing and water piping, where the physical properties of the composition are suitable for the purpose. Extrusion cast film made from or with the inventive composition can also potentially be used in food packaging and industrial stretch wrap applications.

EXAMPLES

A description of all of the resins used in the Examples is presented in Table 1.

TABLE 1

| Resin | Description | Comonomer | MI (g/10 min) | Density (g/cc) | $I_{10}/I_2$ | Irganox 1010 | Irganox 1076 | Irgaphos 168 |
|---|---|---|---|---|---|---|---|---|
| A | Linear polyethylene | None | 5 | 0.96 | 8 | 200 | 0 | 1600 |
| B | Linear polyethylene | None | 10 | 0.96 | NM | 0 | 0 | 0 |
| C | High Pressure LDPE | None | 0.47 | 0.92 | NM | 300 | 0 | 0 |
| E | substantially linear ethylene copolymer | Octene | 3 | 0.90 | 8 | 0 | 500 | 0 |
| F | substantially linear ethylene copolymer | Octene | 30 | 0.90 | 7 | 0 | 500 | 0 |
| G | substantially linear ethylene copolymer | Octene | 6 | 0.90 | 8 | 0 | 500 | 0 |
| H | High Pressure LDPE | None | 8 | 0.918 | NM | 0 | 0 | 0 |
| I | Linear ethylene copolymer | Octene | 6 | 0.92 | 7.6 | 200 | 0 | 0 |
| J | Linear ethylene copolymer | Octene | 25 | 0.92 | NM | 0 | 0 | 0 |
| K | substantially linear ethylene copolymer | Octene | 30 | 0.90 | 7 | 0 | 0 | 0 |
| L | Linear ethylene copolymer | Butene | 20 | 0.92 | NM | NM | NM | 0 |
| M | substantially linear ethylene copolymer | Octene | 25 | NM | NM | NM | NM | 0 |

TABLE 1-continued

| | | | | | | | | |
|---|---|---|---|---|---|---|---|---|
| N | High Pressure LDPE | None | 0.22 | 0.92 | NM | 0 | 0 | 0 |
| O | High Pressure LDPE | None | 2 | 0.92 | NM | 0 | 350 | 0 |
| P | High Pressure LDPE | None | 7 | 0.92 | NM | 0 | 500 | 0 |
| Q | Linear ethylene copolymer | Hexane | 26.8 | 0.9129 | 5.8 | | | |
| R | Linear ethylene copolymer | Butene | 27.2 | 0.920 | 5.4 | | | |
| S | Linear ethylene copolymer | Butene | 31.6 | 0.916 | | | | |
| T | Linear ethylene copolymer | Propylene | 31.7 | 0.917 | | | | |
| U | High Pressure LDPE | None | 12 | 0.918 | NM | | | |
| V | Linear ethylene copolymer | Hexene | 12 | 0.912 | NM | | | |
| W | High Pressure LDPE | None | 8 | 0.918 | NM | 0 | 0 | 0 |
| X | Linear Ethylene copolymer | Octene | 5.63 | | | | | |
| Y | High Pressure LDPE | none | 4.15 | 0.924 | NM | 0 | 0 | 0 |
| Z | Linear Ethylene copolymer | Octene | 30 | 0.900 | 7 | 0 | 500 | 0 |
| AA | High Pressure LDPE | none | 0.38 | 0.9205 | | | | |
| BB | Linear Ethylene copolymer | Octene | 25 | 0.917 | NM | 0 | 0 | 0 |
| B1 | 80% F/20% C | | | | | | | |
| B2 | 40% F/60% H | | | | | | | |

| Resin | PEPQ | DHT-4A | Erucamide | Process | Catalyst |
|---|---|---|---|---|---|
| A | | | | Solution | Ziegler-Natta |
| B | 0 | 0 | 0 | Solution | Ziegler-Natta |
| C | 0 | 0 | 0 | Autoclave | FreeRadical |
| D | | | | Autoclave | FreeRadical |
| E | 1200 | 0 | 0 | Solution | Constrained Geometry |
| F | 800 | 0 | 600 | Solution | Constrained Geometry |
| G | 800 | 0 | 0 | Solution | Constrained Geometry |
| H | 0 | 0 | 0 | Autoclave | FreeRadical |
| I | | 750 | 0 | Solution | Ziegler-Natta |
| J | 0 | 0 | 0 | Solution | Ziegler-Natta |
| K | 0 | 0 | 0 | Solution | Constrained Geometry |
| L | NM | NM | NM | Gas phase | Ziegler-Natta |
| M | NM | NM | NM | Solution | Constrained Geometry/Ziegler-Natta |
| N | 0 | 0 | 0 | Tube | FreeRadical |
| O | 0 | 0 | 0 | Tube | FreeRadical |
| P | 0 | 0 | 0 | Tube | FreeRadical |
| Q | | | | Gas Phase | Constrained Geometry |
| R | | | | Gas Phase | Constrained Geometry |
| S | | | | Gas Phase | Ziegler-Natta/TMA activator |
| T | | | | Gas Phase | Ziegler-Natta |
| U | | | | Autoclave | FreeRadical |
| V | | | | Gas Phase | Constrained Geometry |
| W | | | | Autoclave | FreeRadical |
| X | | | | | Ziegler-Natta |
| Y | | | | Autoclave | FreeRadical |
| Z | 800 | 0 | 600 | Solution | Constrained Geometry |
| AA | | | | Autoclave | FreeRadical |
| BB | 0 | 0 | 0 | Solution | Ziegler-Natta |

Rheology Determination

To illustrate a suitable process for determining the rheology of polymeric material, samples of Resins A, B, C, D, E, B1 and B2 were prepared. The loss modulus G" and the elastic or storage modulus G' for each of these compositions was then determined by Rheometrics RMS800 oscillatory shear rheometer. The values obtained for Resin B1, Resin D and Resin A are reported in Table 2 and a natural log plot of these values (along with the plots for additional resins) is shown in FIG. 1.

Resin B1: Blend composition 14.7 MI, 0.9127 g/cc
S = .7606, G = 3.431

| Freq rad/s | G' dyn/cm2 | G" dyn/cm2 | ln G' | ln G" |
|---|---|---|---|---|
| 0.1 | 51.2707 | 711.76 | 3.937119 | 6.567741 |
| 0.15849 | 100.718 | 1101.21 | 4.612325 | 7.004165 |
| 0.25119 | 190.409 | 1696.52 | 5.249174 | 7.436334 |
| 0.39811 | 351.206 | 2591.23 | 5.861373 | 7.859888 |
| 0.63096 | 631.134 | 3921.32 | 6.447518 | 8.274184 |
| 1 | 1096.95 | 5888.39 | 7.000289 | 8.680738 |
| 1.58489 | 1862.58 | 8773.37 | 7.529718 | 9.079476 |
| 2.51189 | 3083.53 | 12952.7 | 8.03383 | 9.46906 |
| 3.98107 | 5011.2 | 18971.9 | 8.519431 | 9.850714 |
| 6.30957 | 8007.38 | 27555.7 | 8.988119 | 10.22396 |
| 10 | 12603.8 | 39747.5 | 9.441754 | 10.5903 |
| 15.8489 | 19593.4 | 56902 | 9.882948 | 10.94909 |
| 25.1189 | 30172.2 | 80901.4 | 10.31468 | 11.30099 |
| 39.8107 | 45941.2 | 1.14E+05 | 10.73512 | 11.64308 |
| 63.0957 | 69399.6 | 1.59E+05 | 11.14764 | 11.9759 |
| 100 | 1.04E+05 | 2.19E+05 | 11.55445 | 12.29628 |

Resin D: LDPE 4.15 MI, 0.924 g/cc
S = .7281, G = 3.256

| Freq rad/s | G' dyn/cm2 | G" dyn/cm2 | ln G' | ln G" |
|---|---|---|---|---|
| 0.1 | 938.84 | 4103.7 | 6.844645 | 8.319644 |
| 0.1585 | 1678.3 | 6.00E+03 | 7.425537 | 8.699715 |
| 0.2512 | 2886.8 | 8.57E+03 | 7.967904 | 9.055895 |
| 0.3981 | 4.73E+03 | 1.20E+04 | 8.461955 | 9.392662 |
| 0.631 | 7.49E+03 | 1.66E+04 | 8.921511 | 9.717158 |
| 1 | 1.15E+04 | 2.24E+04 | 9.350102 | 10.01682 |
| 1.585 | 1.70E+04 | 2.99E+04 | 9.740969 | 10.30561 |
| 2.512 | 2.46E+04 | 3.94E+04 | 10.1105 | 10.58152 |
| 3.9813 | 3.48E+04 | 5.11E+04 | 10.45737 | 10.84154 |
| 6.3101 | 4.84E+04 | 6.55E+04 | 10.78726 | 11.08981 |
| 10.001 | 6.61E+04 | 8.31E+04 | 11.09892 | 11.3278 |
| 15.85 | 8.89E+04 | 1.04E+05 | 11.39527 | 11.55215 |
| 25.121 | 1.18E+05 | 1.30E+05 | 11.67844 | 11.77529 |
| 39.813 | 1.54E+05 | 1.59E+05 | 11.94471 | 11.97666 |
| 63.101 | 1.99E+05 | 1.94E+05 | 12.20106 | 12.17561 |
| 100 | 2.53E+05 | 2.34E+05 | 12.44114 | 12.36308 |

Resin A: HDPE 5.162 MI, 0.9625 g/cc
S = .7174, G = 4.16

| Freq rad/s | G' dyn/cm2 | G" dyn/cm2 | ln G' | ln G" |
|---|---|---|---|---|
| 0.1 | 123.62 | 2180.5 | 4.817212 | 7.687309 |
| 0.1585 | 234.09 | 3272 | 5.455706 | 8.093157 |
| 0.2512 | 462.24 | 5074.2 | 6.136084 | 8.531924 |
| 0.3981 | 852.31 | 7.80E+03 | 6.74795 | 8.961481 |
| 0.631 | 1524.4 | 1.20E+04 | 7.329356 | 9.392662 |
| 1 | 2689.6 | 1.82E+04 | 7.897148 | 9.809177 |
| 1.585 | 4795.4 | 2.75E+04 | 8.475412 | 10.22194 |
| 2.512 | 8.26E+03 | 4.11E+04 | 9.019737 | 10.62376 |
| 3.9813 | 1.42E+04 | 6.09E+04 | 9.560997 | 11.01699 |
| 6.3101 | 2.41E+04 | 8.93E+04 | 10.08997 | 11.39976 |
| 10.001 | 4.00E+04 | 1.30E+05 | 10.59663 | 11.77529 |
| 15.85 | 6.54E+04 | 1.85E+05 | 11.08828 | 12.12811 |
| 25.121 | 1.05E+05 | 2.60E+05 | 11.56172 | 12.46844 |
| 39.813 | 1.65E+05 | 3.59E+05 | 12.0137 | 12.79108 |
| 63.101 | 2.54E+05 | 4.86E+05 | 12.44509 | 13.09396 |
| 100 | 3.81E+05 | 6.43E+05 | 12.85055 | 13.3739 |

A linear least squares regression can be performed on the ln (G") vs. ln (G') data for each of the resins, resulting in an equation of the form: ln (G")=(S)*(ln (G')+G; Where S is the regressed slope of the line and G is the natural log of G" when the natural log of G' is zero.

Figure 2:
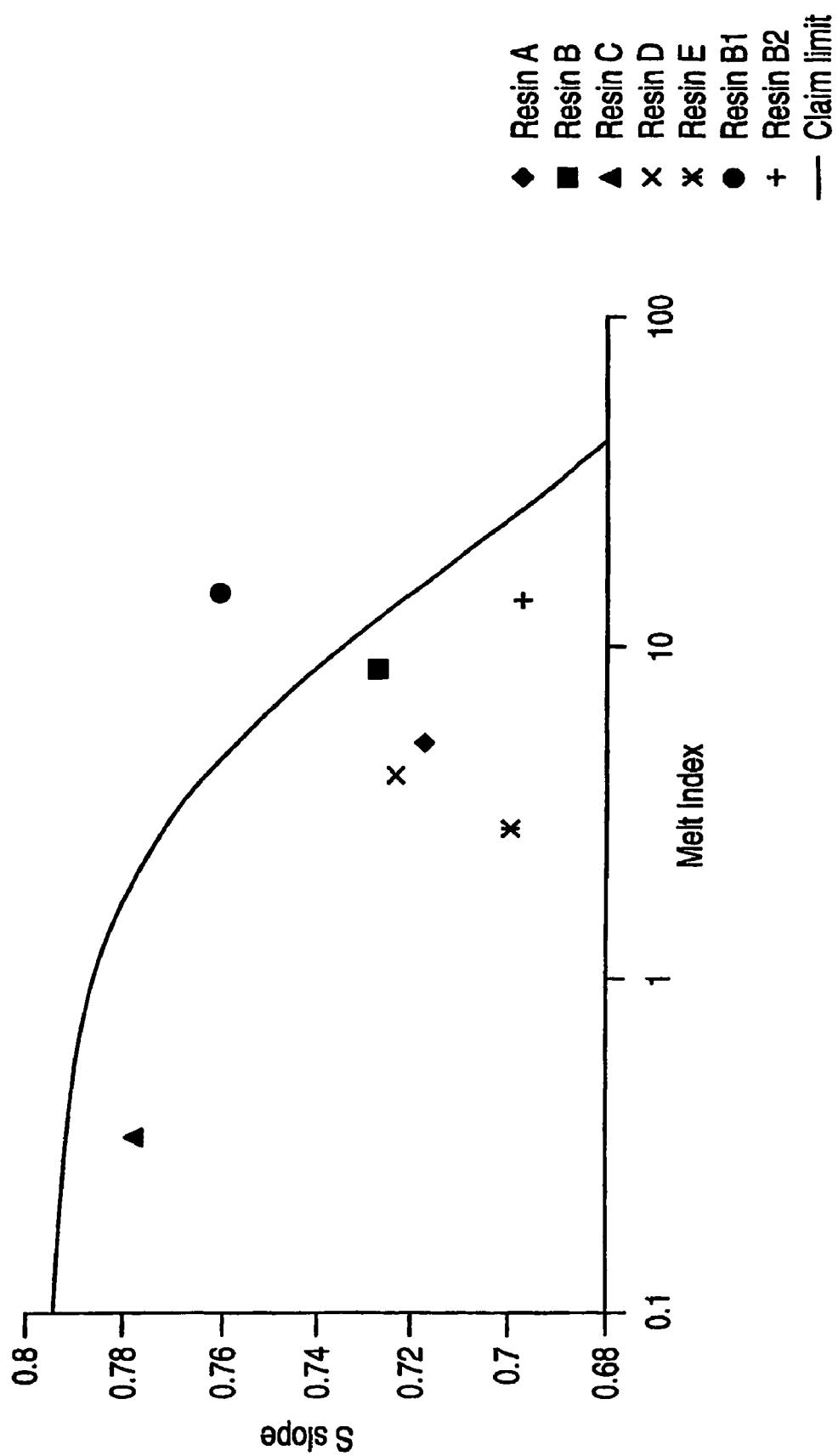
FIG. 2 is a plot of the slope of the line obtained from a linear least squares regression from the plot in FIG. 1 versus melt index.

Values for this slope can then be plotted against the melt index. These values are shown in FIG. 2.

The line formed by the equation S=[0.635*(melt index)+13.2]/[(melt index)+16.6] is also presented on this plot, and those compositions which have slopes below this line are not within the scope of the present invention.

Molecular Architecture Determination

In order to determine the molecular architecture of various polymer compositions, the following procedure was used:

The chromatographic system consisted of a Waters (Millford, Mass.) 150C high temperature chromatograph equipped with a Precision Detectors (Amherst, Mass.) 2-angle laser light scattering detector Model 2040. The 15-degree angle of the light scattering detector was used for the calculation of molecular weights. Data collection was performed using Viscotek (Houston, Tex.) TriSEC software version 3 and a 4-channel Viscotek Data Manager DM400. The system was equipped with an on-line solvent degas device from Polymer Laboratories (Shropshire, UK).

The carousel compartment was operated at 140° C. and the column compartment was operated at 150° C. The columns used were 7 Polymer Laboratories 20-micron Mixed-A LS columns. The solvent used was 1,2,4 trichlorobenzene. The samples were prepared at a concentration of 0.1 grams of polymer in 50 milliliters of solvent. The chromatographic solvent and the sample preparation solvent contained 200 ppm of butylated hydroxytoluene (BHT). Both solvent sources were nitrogen sparged. Polyethylene samples were stirred gently at 160 degrees Celsius for 4 hours. The injection volume used was 200 microliters and the flow rate was 1.0 milliliters/minute.

Calibration of the GPC column set was performed with 18 narrow molecular weight distribution polystyrene standards with molecular weights ranging from 580 to 8,400,000 and were arranged in 5 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to or greater than 1,000,000, and 0.05 grams in 50 milliliters of solvent for molecular weights less than 1,000, 000. The polystyrene standards were dissolved at 80 degrees Celsius with gentle agitation for 30 minutes. The narrow standards mixtures were run first and in order of decreasing highest molecular weight component to minimize degradation. The polystyrene standard peak molecular weights were converted to polyethylene molecular weights using the following equation (as described in Williams and Ward, J. Polym. Sci., Polym. Let., 6, 621 (1968)):

$$M_{polyethylene} = A \times (M_{polystyrene})^B$$

Where M is the molecular weight, A has a value of 0.41 and B is equal to 1.0. A fourth order polynomial was used to fit the respective polyethylene-equivalent calibration points.

The total plate count of the GPC column set was performed with Eicosane (prepared at 0.04 g in 50 milliliters of TCB and dissolved for 20 minutes with gentle agitation.) The plate count and symmetry were measured on a 200 microliter injection according to the following equations:

PlateCount=5.54*(RV at Peak Maximum/(Peak width at ½ height))^2

Where RV is the retention volume in milliliters and the peak width is in milliliters.

Symmetry=(Rear peak width at one tenth height−RV at Peak maximum)/(RV at Peak Maximum−Front peak width at one tenth height)

Where RV is the retention volume in milliliters and the peak width is in milliliters.

The Systematic Approach for the determination of multi-detector offsets was done in a manner consistent with that published by Balke, Mourey, et. Al (Mourey and Balke, Chromatography Polym. Chpt 12, (1992)) (Balke, Thitiratsakul, Lew, Cheung, Mourey, Chromatography Polym. Chpt 13, (1992)), optimizing dual detector log MW results from Dow broad polystyrene 1683 to the narrow standard column calibration results from the narrow standards calibration curve using in-house software. The molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight was obtained from the sample refractive index area and the refractive index detector calibration from a linear polyethylene homopolymer of 115,000 molecular weight. The chromatographic concentrations were assumed low enough to eliminate addressing $2^{nd}$ Virial coefficient effects (concentration effects on molecular weight).

In order to monitor the deviations over time, which may contain an elution component (caused by chromatographic changes) and a flow rate component (caused by pump changes), a late eluting narrow peak is generally used as a "marker peak". A flow rate marker was therefore established based on the air peak mismatch between the degassed chromatographic system solvent and the elution sample on one of the polystyrene cocktail mixtures. This flow rate marker was used to linearly correct the flow rate for all samples by alignment of the air peaks. Any changes in the time of the marker peak are then assumed to be related to a linear shift in both flow rate and chromatographic slope.

To facilitate the highest accuracy of a retention volume (RV) measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (as a measurement of the calibration slope) is calculated as Equation 1. In a high-temperature SEC system, an antioxidant mismatch peak or an air peak (if the mobile phase is sufficiently degassed) can be used as an effective flow rate marker. The primary features of an effective flow rate marker are as follows: the flow marker should be mono-dispersed. The flow marker should elute close to the total column permeation volume. The flow marker should not interfere with the chromatographic integration window of the sample.

Flowrateeffective=Flowratenominal* FlowMarker-Calibration/FlowmarkerObserved        Equation 1

The preferred column set is of 20 micron particle size and "mixed" porosity to adequately separate the highest molecular weight fractions appropriate to the claims.

Figure 3:
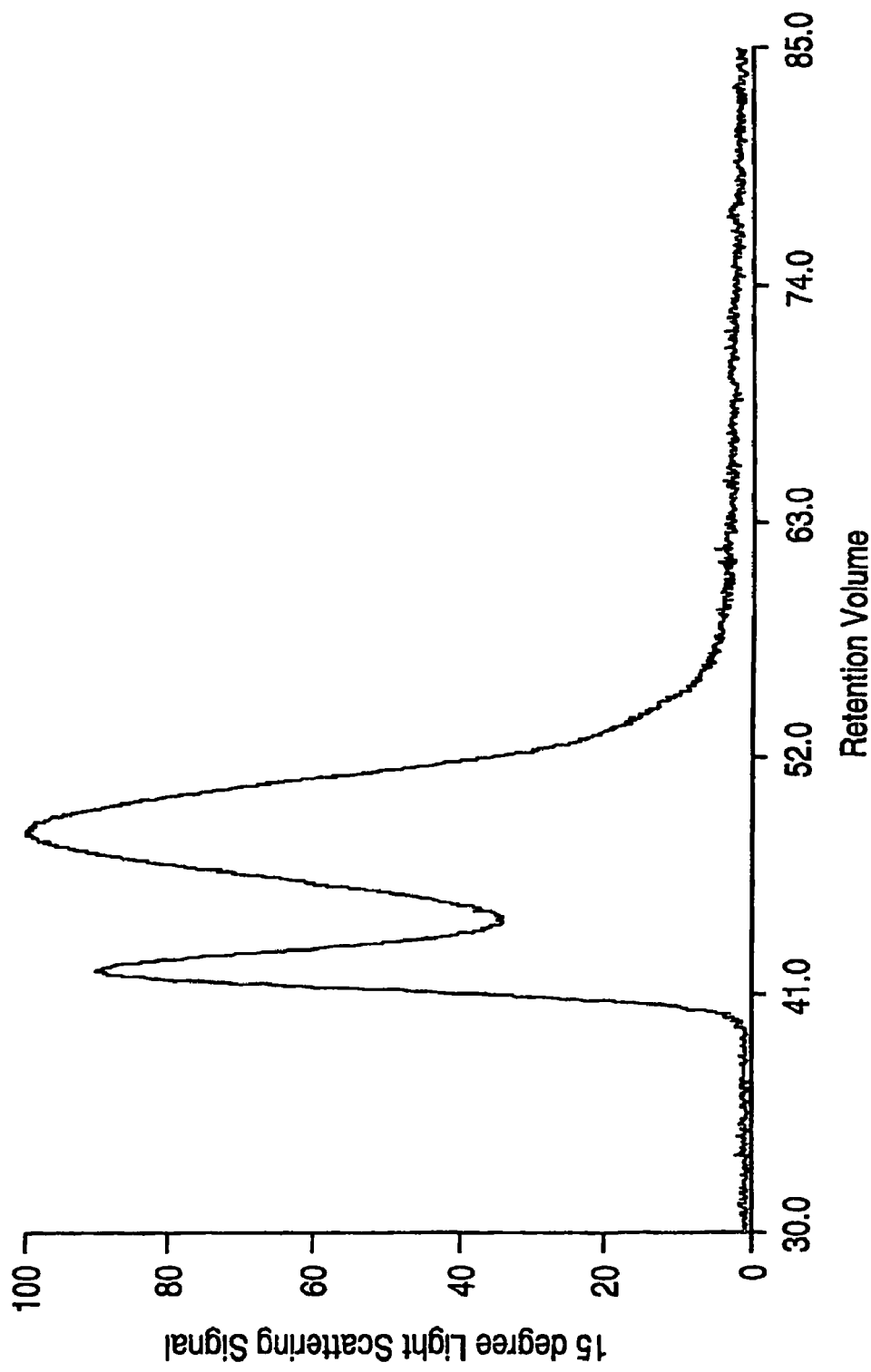
FIG. 3 is an example of an appropriate light scattering chromatogram obtained on an NBS 1476 high pressure low density polyethylene standard.

The verification of adequate column separation and appropriate shear rate can be made by viewing the low angle (less than 20 degrees) of the on-line light scattering detector on an NBS 1476 high pressure low density polyethylene standard. The appropriate light scattering chromatogram should appear bimodal (very high MW peak and moderate molecular weight peak) with approximately equivalent peak heights as shown in FIG. 3. There should be adequate separation by demonstrating a trough height between the two peaks less than half of the total LS peak height. The plate count for the chromatographic system (based on eicosane as discussed previously) should be greater than 32,000 and symmetry should be between 1.00 and 1.12.

The calculation of the cumulative detector fractions (CDF) for the refractometer ("CDF RI") and the light scattering detector ("CDF LS") are accomplished by the following steps:

1) Linearly flow correct the chromatogram based on the relative retention volume ratio of the air peak between the sample and that of a consistent narrow standards cocktail mixture.
2) Correct the light scattering detector offset relative to the refractometer as described in the calibration section.
3) Subtract baselines from the light scattering and refractometer chromatograms and set integration windows making certain to integrate all of the low molecular weight retention volume range in the light scattering chromatogram that is observable from the refractometer chromatogram.
4) Calculate the molecular weights at each data slice based on the polystyrene calibration curve, modified by the polystyrene to polyethylene conversion factor (0.41) as described in the calibration section.
5) Calculate the cumulative detector fraction (CDF) of each chromatogram (CDF RI and CDF LS) based on its baseline-subtracted peak height (H) from high to low molecular weight (low to high retention volume) at each data slice (i) according to the following equation:

$$CDF_i = \frac{\sum_{j=LowestRVindex}^{i} H_j}{\sum_{j=LowestRVindex}^{HighestRVindex} H_j}$$

where i is between the LowestRVindex and the HighestRVindex

6) A plot of CDF versus molecular weight is obtained by calculating the CDF at each integrated data slice from step (5) and plotting it versus the log of the polyethylene equivalent molecular weight at each integrated data slice from step (4).

Figure 4:
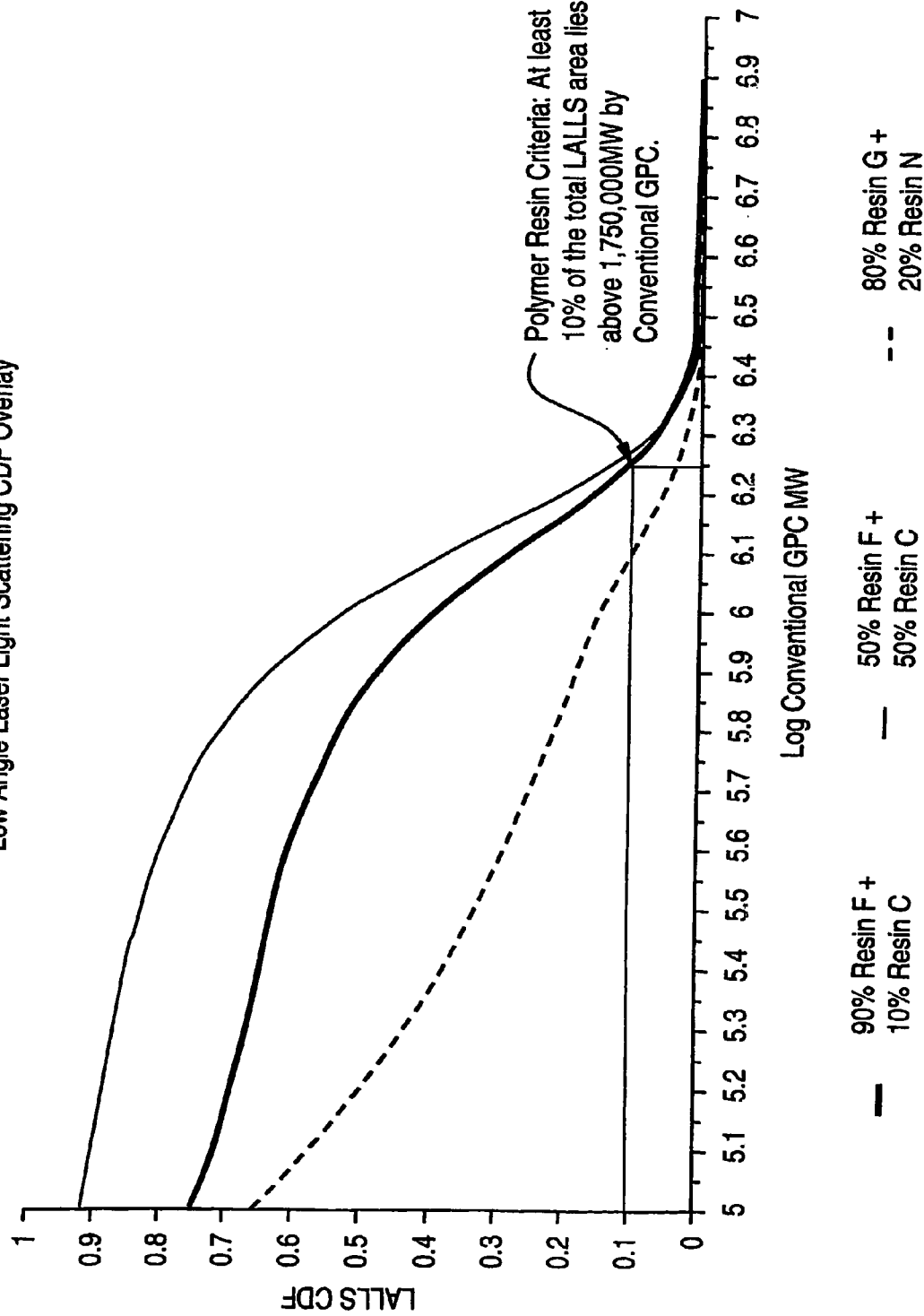
FIG. 4 is a plot of the cumulative detector fraction (CDF) of the low angle light scattering detector (LS) versus the log base 10 of the linear polyethylene equivalent GPC MW
Figure 5:
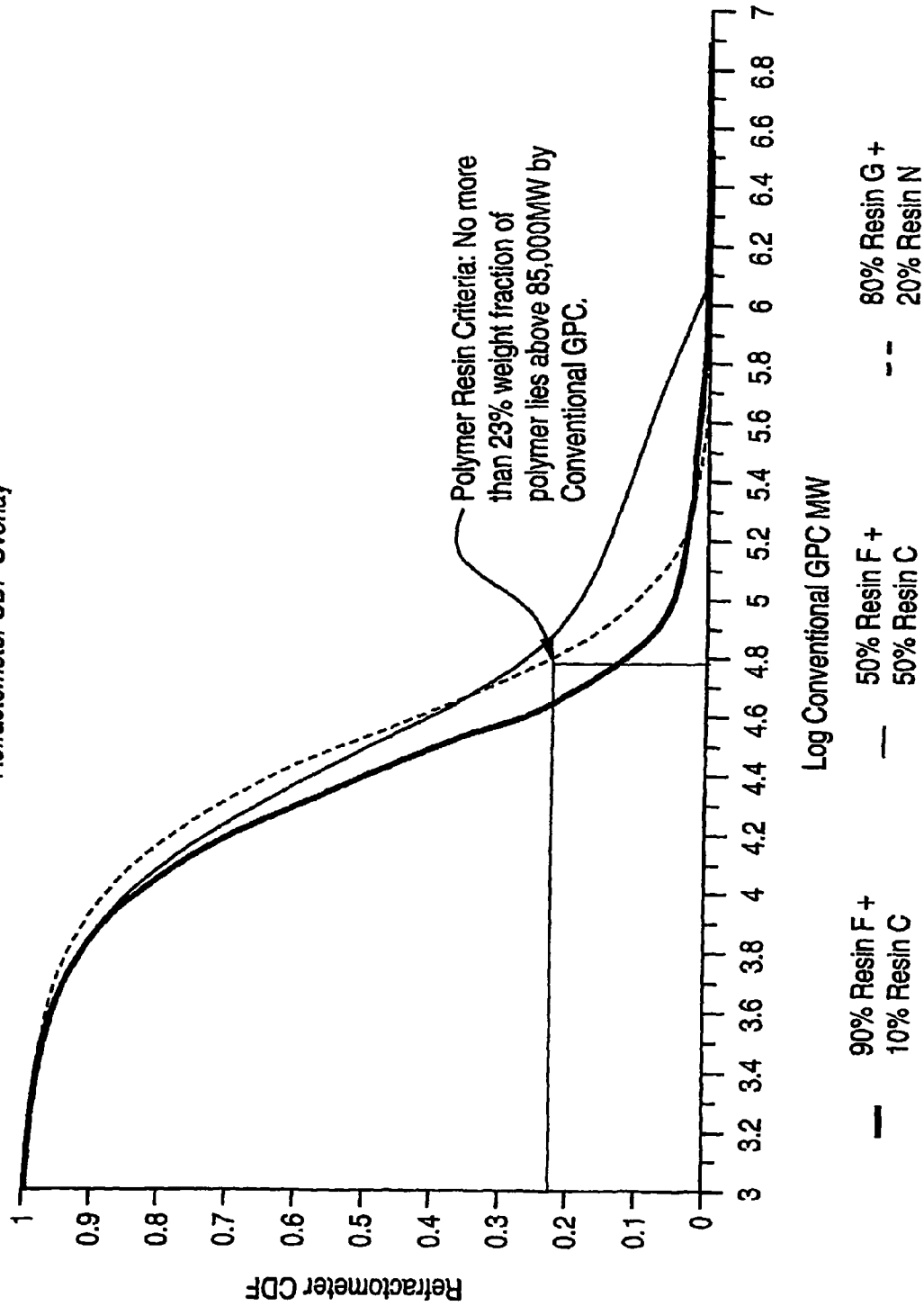
FIG. 5 is a plot the cumulative detector fraction (CDF) of the refractometer detector (RI) versus the log base 10 of the linear polyethylene equivalent GPC MW.

Using this GPC method, an analysis was done on the following blends: a blend comprising 90% Resin F and 10% Resin C; a blend comprising 50% Resin F and 50% Resin C; and a blend comprising 80% Resin G and 20% Resin N. The plots for these materials are shown in FIG. 4 and FIG. 5. These figures also indicate the log of 85,000 MW for the CDF RI plot, and the log of 1,750,000 MW for CDF LS plot. From these lines it can clearly be seen that the blend of 80% Resin G and 20% Resin N does not meet the CDF LS criteria for the present invention and neither the blend of 80% Resin G and 20% Resin N nor the blend comprising 50% Resin F and 50% Resin C meets the CDF RI criteria for the present invention.

In order to demonstrate the neck-in performance at varying melt strengths, a series of compositions comprising blends of Linear PE and LDPE were prepared. The particular resins and the amounts used are indicated in Table 3. Table 3also presents the melt strength of the overall blend, the melt index of the overall blend, the neck-in observed when running at 440 ft/minute at an extrusion rate of approximately 250 lbs/hr (and where available at 880 ft/min), the drawdown (a "+" indicates that the drawdown limit was not reached), the slope S determined in accordance with the rheological methods described above for the unextruded resin, and the CDF RI (expressed as the fraction above 85,000 MW) and CDF LS (expressed as the fraction above 1,750,000 MW) from the GPC. The table also reports some determinations of S made on a film layer after extrusion. To obtain the extruded resin, the extruded resin may be separated from a coated substrate or more conveniently may be extruded directly onto a suitable metal sheet. This latter method can preferably be done at full extrusion rate (for example 250 lbs/hr) prior to positioning the die over the substrate intended for the coating operation.

The results clearly show the superiority of the resins of the present invention in extrusion coating applications. In particular, comparative Example 17 shows that an autoclave LDPE resin which was designed for extrusion coating and which has a similar melt index to that of the preferred inventive compositions does not provide the comparably low neck-in values. Comparative Example 18 shows that blends of metallocene gas phase resins having a lower melt index than the preferred Linear PE with LDPE with a melt index of 8, exhibit significantly higher neck-in (and it was also reported that this blend required a higher motor load).

TABLE 3

| Ex. | Linear PE | LD-PE | % Linear PE | % LD-PE | MI of Blend | Resin slope S | Extrudate slope S | Extrudate MI | CDF RI | CDF LS |
|---|---|---|---|---|---|---|---|---|---|---|
| 1a | F | C | 100 | 0 | n/a | 0.643 | | | | |
| 1b | F | C | 90 | 10 | 22.17 | 0.706 | | | 0.132 | 0.121 |
| 1c | F | C | 85 | 15 | 18.7 | 0.729 | | | 0.143 | 0.123 |
| 1d (extruded at 616° F.) | F | C | 80 | 20 | 14.67 | 0.761 | 0.811 | 8.57 | 0.172 | 0.125 |
| 1e (extruded at 630° F.) | F | C | 80 | 20 | | | 0.854 | 10.35 | | |
| 1f | F | C | 50 | 50 | 3.73 | 0.801 | | | 0.277 | 0.141 |
| 1g | F | C | 40 | 60 | 2.57 | 0.803 | | | 0.314 | 0.146 |
| 1h | F | C | 25 | 75 | 1.29 | 0.799 | | | 0.369 | 0.153 |
| 1i | F | C | 15 | 85 | 0.75 | 0.793 | | | 0.406 | 0.158 |
| 2a | E | C | 100 | 0 | n/a | 0.699 | | | | |
| 2b | E | C | 90 | 10 | 2.21 | 0.746 | | | 0.313 | 0.101 |
| 2c | E | C | 85 | 15 | 1.97 | 0.763 | | | 0.321 | 0.118 |
| 3a | F | H | 90 | 10 | 27.5 | 0.646 | | | 0.117 | 0.025 |
| 3b | F | H | 85 | 15 | 25.59 | 0.649 | | | 0.127 | 0.031 |
| 3c | F | H | 80 | 20 | 24.67 | 0.666 | | | 0.138 | 0.034 |
| 3d | F | H | 50 | 50 | 16.03 | 0.694 | | | 0.202 | 0.045 |
| 3e | F | H | 40 | 60 | 13.95 | 0.697 | | | 0.224 | 0.046 |
| 3f | F | H | 25 | 75 | 11.41 | 0.711 | | | 0.256 | 0.048 |
| 3g | F | H | 15 | 85 | 9.78 | 0.713 | | | 0.277 | 0.049 |
| 3h | F | H | 100 | 0 | n/a | 0.643 | | | | |
| 4a | E | H | 0 | 100 | n/a | 0.699 | | | | |
| 4b | E | H | 90 | 10 | 2.90 | 0.717 | | | 0.299 | 0.042 |
| 4c | E | H | 85 | 15 | 2.63 | 0.722 | | | 0.300 | 0.045 |
| 4d | E | H | 80 | 20 | 2.68 | 0.728 | | | 0.301 | 0.046 |
| 4e | E | H | 50 | 50 | 3.34 | 0.743 | | | 0.304 | 0.049 |
| 4f | E | H | 40 | 60 | 3.88 | 0.738 | | | 0.305 | 0.049 |
| 4g | E | H | 25 | 75 | 4.79 | 0.735 | | | 0.306 | 0.049 |
| 4h | E | H | 15 | 85 | 5.70 | 0.728 | | | 0.308 | 0.049 |
| 5 | G | N | 80 | 20 | 3.22 | 0.796 | | | 0.148 | 0.027 |
| 6 | G | O | 60 | 40 | 3.39 | 0.717 | | | | |
| 7 | G | P | 50 | 50 | 5.52 | 0.673 | | | 0.147 | 0.039 |
| 8 | I | | 100 | 0 | | | 0.820 | 2.48 | | |
| 9a (extruded at 630° F.) | K | C | 80 | 20 | | | 0.836 | 7.465 | 0.172 | 0.125 |
| 9b (extruded at 640° F.) | K | C | 80 | 20 | | | 0.813 | 11.12 | 0.172 | 0.125 |
| 9c | K | C | 80 | 20 | | | | | 0.172 | 0.125 |
| 10 | M | C | 85 | 15 | | | 0.875 | | | |
| 11a | L | C | 100 | 0 | 20 | | | | | |
| 11b | L | C | 90 | 10 | 13.7 | | | | | |
| 11c | L | C | 80 | 20 | 9.4 | | | | | |
| 12a | J | C | 100 | 0 | 25 | | | | | |
| 12b | J | C | 90 | 10 | 17 | | | | 0.134 | 0.122 |
| 12c | J | C | 85 | 15 | 14 | | | | 0.152 | 0.135 |
| 12d | J | C | 80 | 20 | 11 | | | | 0.169 | 0.143 |
| 12e | J | C | 75 | 25 | 9 | | | | 0.187 | 0.148 |
| 12f | J | C | 70 | 30 | 7.6 | | | | 0.204 | 0.152 |
| 13 | Q | C | 82.5 | 17.5 | 15.48 | 0.774 | 0.835 | 13.7 | 0.157 | 0.096 |
| 14 | R | C | 82.5 | 17.5 | 14.54 | 0.788 | 0.812 | 11.6 | 0.169 | 0.102 |
| 15 | S | C | 80 | 20 | 13.13 | 0.744 | 0.800 | 7.708 | | |
| 16 | T | C | 80 | 20 | 13.69 | 0.746 | 0.923 | 5.849 | | |
| 17 | — | U | 0 | 100 | 11.19 | 0.729 | | | 0.284 | 0.057 |
| 18 | V | W | 80 | 20 | 11 | | 0.787 | 5.92 | | |
| 19 | X | Y | 83 | 17 | 5.5 | 0.7056 | | | | |
| 20 | Z | AA | 85 | 15 | | | 0.720 | 14.4 | | |
| 21 | BB | C | 85 | 15 | | 0.804 | | | | |

| Example | Melt strength of Blend | 440 Neck-in | 880 Neck-in | Drawdown | Extrusion temperature (° F.) |
|---|---|---|---|---|---|
| 1a | 0.5 | 8.25 | n/a | 850 (Edge Weave) | 598 |
| 1b | 1 | 3.5 | 2.875 | 1500+ | 590 |
| 1c | 2.7 | 2.5 | 2 | 1500+ | 580 |
| 1d | 3.5 | 2 | 1.875 | 1500+ | 616 |
| 1e | 3.5 | 2.25 | 1.75 | 1500+ | 630 |
| 1f | 15 | 1.25 | n/a | 658 | 597 |

TABLE 3-continued

| | | | | | |
|---|---|---|---|---|---|
| 1g | 16.8 | n/a | n/a | 350 | 605 |
| 1h | 22.7 | n/a | n/a | 320 | 611 |
| 1i | 27.5 | n/a | n/a | 251 | 615 |
| 2a | 2 | 7 | n/a | 550 (draw resonance) | 615 |
| 2b | 7.3 | 3.375 | 3.58 | 1220 | 611 |
| 2c | 10 | 2.5 | n/a | 700 | 611 |
| 3a | 0.25 | 8.125 | 9 | 950 (edge weave) 1100 (draw resonance) | 597 |
| 3b | 0.5 | 7.75 | 6.75 | 1500+ | 598 |
| 3c | 1 | 7.625 | 5.75 | 1500+ | 598 |
| 3d | 2.1 | 4 | 2.625 | 1500+ | 602 |
| 3e | 4.5 | 3.125 | 2.25 | 1500+ | 604 |
| 3f | 5.7 | 2.375 | 1.875 | 1500+ | 604 |
| 3g | 6.5 | 2 | 1.5 | 1500+ | 601 |
| 3h | 6.5 | 1.5 | 1.25 | 1300 | 608 |
| 4a | 6.5 | 1.5 | 1.25 | 1300 | 608 |
| 4b | 4 | 5.125 | 4.875 | 1500+ | 616 |
| 4c | 5 | 4.375 | 4.125 | 1500 | 604 |
| 4d | 5.82 | 3.75 | 3.5 | 1500+ | 606 |
| 4e | 9.7 | 2.375 | 2.5 | 1300 | 607 |
| 4f | 10.4 | 2.25 | 2 | 1250 | 605 |
| 4g | 9.7 | 2 | 1.875 | 1100 | 601 |
| 4h | 9.4 | 1.75 | 1.5 | 1100 | 588 |
| 5 | 6.1 | 4 | 3.75 | 1500+ | |
| 6 | 4.5 | 5.25 | 4.625 | 1500+ | |
| 7 | 2.7 | 7 | 6.75 | 1500+ | |
| 8 | n/a | 7 | n/a | 575 (draw resonance) | |
| 9a | n/a | 1.875 | n/a | n/a | 630 |
| 9b | n/a | 2 | n/a | n/a | 640 |
| 9c | n/a | 1.75 | n/a | n/a | |
| 10 | n/a | 2.125 | n/a | 1450 | |
| 11a | n/a | 8.125 | 9.25 | 740 (edge weave) | |
| 11b | n/a | 2.625 | 2.5 | 1500+ | |
| 11c | n/a | 1.625 | n/a | 740 | |
| 12a | n/a | 8.75 | 10.125 | 1550 Draw Resonance | |
| 12b | n/a | 4.25 | 3.25 | 2150 | |
| 12c | n/a | 2.5 | 2.25 | 1800 | |
| 12d | n/a | 2.375 | 2.125 | 1507 | |
| 12e | n/a | 1.875 | 1.625 | 1410 | |
| 12f | n/a | 1.75 | 1.625 | 1080 | |
| 13 | 3.5 | 2.5 | n/a | 1500+ | |
| 14 | 3.3 | 2.375 | n/a | 1500+ | |
| 15 | n/a | 2.25 | 2 | 1249 | |
| 16 | n/a | 2 | n/a | 1380 | |
| 17 | n/a | 3.125 | 2.375 | 1500+ | |
| 18 | n/a | 3.625 | 3.125 | 1500+ | |
| 19 | n/a | 4.125 | 4.125 | 1500+ | |
| 20 | n/a | 8.625 | 7.5 | 1500+ | |
| 21 | n/a | 2.5 | 2.25 | 1800 | |

Figure 7:
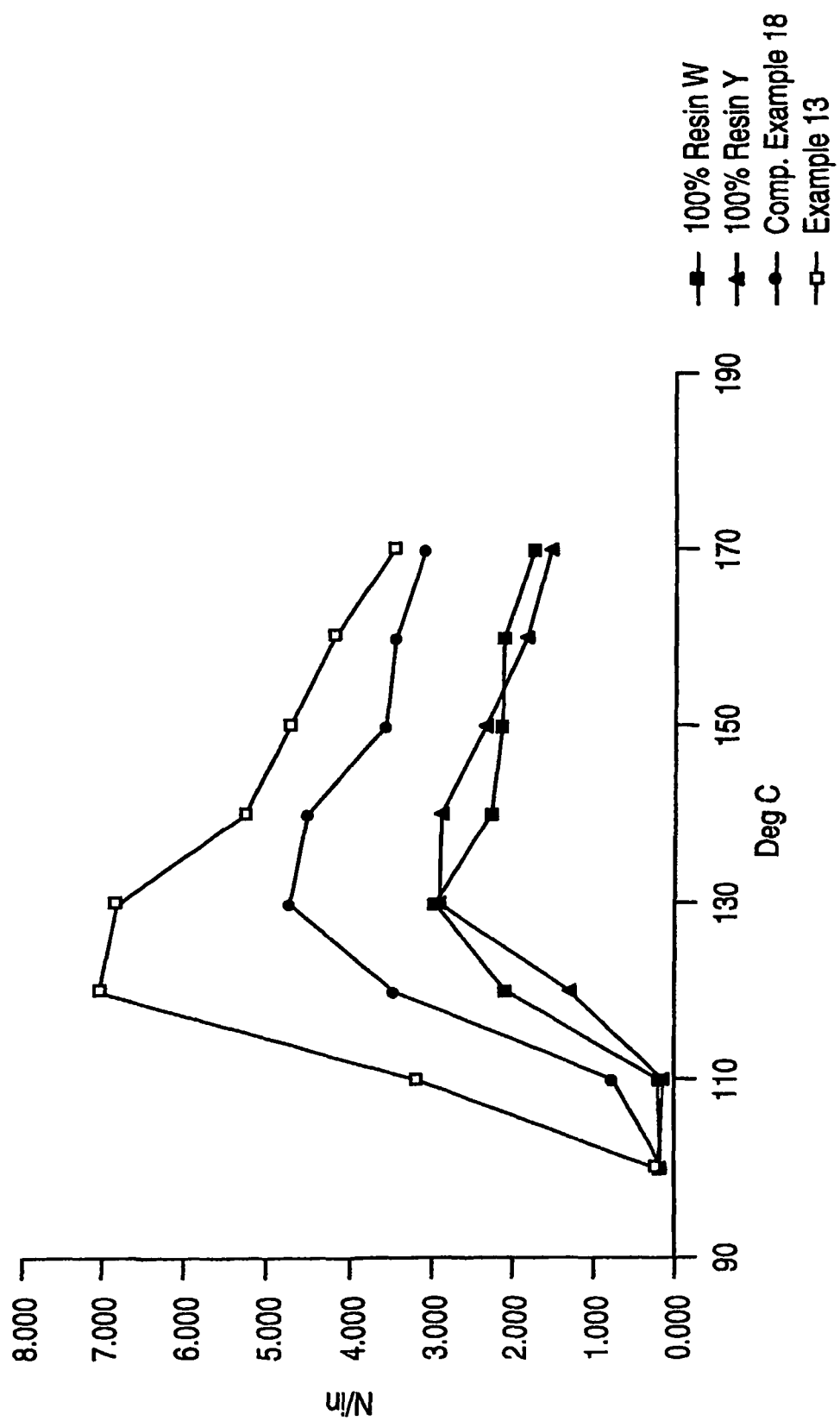
FIG. 7 is a plot of Hot Tack strength vs. temperature for a series of materials, showing the superior hot-tack performance possible with this invention through appropriate selection of the Linear PE component.

In a further set of examples, polymers were coated onto 1 mil Kraft paper at 615° F. (324° C.), cut into 1 inch wide strips and the hot tack strength was measured using a Hot Tack tester from J&B Instruments. The samples were subjected to a pressure of 0.275 N/mm² for a seal time of 0.5 seconds, then allowed to cool for 0.1 seconds. The peel speed was set at 200 mm/sec. The resulting data is presented in the FIG. 7 below. The data show the superiority of this aspect of the present invention, particularly when compared to conventional LDPE extrusion coating resins, as the inventive composition has much higher hot-tack strength over the broad range of temperatures.

The invention claimed is:

1. A composition comprising a polymeric material having a rheology such that the slope (or S) determined by linear least squares regression, of a plot of the natural kg of loss modulus (or G″) versus natural log of storage modulus (or G′) is greater than [0.635*(melt index)+13.2]/[(melt index)+16.6], and wherein the polymeric material has a CDF RI fraction less than 0.23 of a GPC chromatogram which has a molecular weight above 85,000 g/mol, and a CDF LS fraction of more than 0.07 at a conventional GPC molecular weight of 1,750,000 g/mol or greater; wherein the polymeric material has a melt index greater than 10 g/10 min and comprises an LDPE having a high molecular weight highly branched component with an MWD greater than 10 and a Mw(absolute)/Mw(GPC) ratio greater than 3.0; and where melt index is determined according to ASTM 1238 condition 190° C/2.16 Kg.

2. The composition of claim 1 wherein the polymeric material has a melt strength less than about 5 cN.

3. The composition of claim 1 wherein the polymeric material comprises a blend of at least two polymeric materials.

4. The composition of claim 1 wherein the polymeric material comprises Linear PE.

5. The composition of claim 1 wherein the LDPE is made in an autoclave reactor with chilled ethylene feed below 35° C. operating in single phase mode.

6. The composition of claim 1 wherein the polymeric material has a melt index greater than about 13 g/10 min.

7. The composition of claim 1 wherein the polymeric material has a melt index less than about 100 g/10 min.

8. The composition of claim 1 wherein the polymeric material has a Mark-Houwink plot where the slope is less than 0.25 in the absolute molecular weight range between 300,000 and 3,000,000 g/mol.

9. The composition of claim 1 wherein the value for S is at least 1% greater than [0.635*(melt index)+13.2]/[(melt index)+16.6].

10. The composition of claim 9 wherein the value for S is at least 2% greater than [0.635*(melt index)+13.2]/[(melt index)+16.6].

11. The composition of claim 1 wherein the polymeric material has a CDF RI fraction less than 0.21 of a GPC chromatogram which has a molecular weight above 85,000 g/mol.

12. The composition of claim 1 wherein the polymeric material has a CDF RI fraction less than 0.20 of a GPC chromatogram which has a molecular weight above 85,000 g/mol.

13. The composition of claim 1 wherein the polymer material has a CDF LS fraction greater than 0.09 of a GPC chromatogram which has a molecular weight above 1,750,000 g/mol.

14. In a process for extruding a polymeric material onto a substrate, the improvement comprising: using a polymeric material of claim 1.

15. The process of claim 14 wherein the neck-in observed is less than 3 inches when running at a line speed of 440 ft/min.

16. The process of claim 14 wherein the neck-in observed is less than 2.5 inches when running at a line speed of 440 ft/min.

17. The process of claim 14 wherein the neck-in observed is less than 2 inches when running at a line speed of 440 ft/min.

18. The process of claim 14 wherein the draw down is at least 1500 ft/min.

19. The process of claim 14 wherein the polymeric material has a melt strength of less than 5 cN.

20. The composition of claim 1 which has been extruded into a film layer such that the extruded polymeric film layer has a rheology such that the slope (or S) determined by linear least squares regression, of a natural log-natural log plot of loss modulus (or G") versus storage modulus (or C') is greater than (0.665*(melt index)+14.2)/((melt index)+16.6).

21. The film layer of claim 20 wherein the layer has a CDF LS fraction of more than 0.09 at a conventional GPC molecular weight of 1,750,000 g/mol or greater.

22. The film layer of claim 20 in which the film layer was produced using an extrusion coating, extrusion lamination, or cast film process.

23. The composition of claim 1 comprising:
  a. from about 10 to about 25 percent by weight of the composition of a high pressure low density type polyethylene resin having a melt index ($I_2$) less than about 2, a molecular weight distribution greater than about 10, a Mw(absolute)/Mw(GPC) ratio greater than about 3.0, and a melt strength greater than about 24.1-18.0*log10 (MI); and
  b. from about 90 to about 75 percent by weight of the composition, of a Linear PE having a density in the range of 0.97-0.857 g/cc and a melt index ($I_2$) in the range of 20-100;
    wherein the MI of the composition of matter is greater than about 10 g/10 minutes.

24. The composition of claim 23 in which component a) has a melt index ($I_2$) less than about 1 g/10 minutes.

25. The composition of claim 23 wherein the composition has a melt strength less than about 5 cN.

26. The composition of claim 23 wherein the Mw(absolute)/Mw(GPC) ratio of component (a) is greater than 3.2.

27. The composition of claim 23 wherein the Mw(absolute)/Mw(GPC) ratio of component (a) is greater than 3.5.

* * * * *